United States Patent
Gordon et al.

(10) Patent No.: US 6,822,066 B2
(45) Date of Patent: Nov. 23, 2004

(54) ORGANOSILOXANE RESIN-POLYENE MATERIALS

(75) Inventors: Glenn Viaplana Gordon, Midland, MI (US); Tina Marie Leaym, Saginaw, MI (US); Randall Gene Schmidt, Midland, MI (US); Gary Michael Wieber, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 31 days.

(21) Appl. No.: 10/299,249

(22) Filed: Nov. 18, 2002

(65) Prior Publication Data

US 2004/0097639 A1 May 20, 2004

(51) Int. Cl.$^7$ .................. C08G 77/04; C08G 77/42; C08L 83/04; C08L 83/10
(52) U.S. Cl. .................. 528/25; 528/12; 528/31; 525/479; 524/588
(58) Field of Search .................. 528/12, 25, 31; 525/479; 524/588

(56) References Cited

U.S. PATENT DOCUMENTS

| | | | |
|---|---|---|---|
| 4,609,574 A * | 9/1986 | Keryk et al. | 427/407.1 |
| 4,900,779 A | 2/1990 | Leibfried | 524/862 |
| 4,902,731 A | 2/1990 | Leibfried | 523/222 |
| 5,013,809 A | 5/1991 | Leibfried, Sr. | 524/862 |
| 5,025,048 A | 6/1991 | Burnier | 524/99 |
| 5,068,303 A | 11/1991 | Bard et al. | 528/25 |
| 5,077,134 A | 12/1991 | Leibfried, Sr. | 428/447 |
| 5,118,735 A | 6/1992 | Burnier | 524/99 |
| 5,124,375 A | 6/1992 | Leibfried | 523/222 |
| 5,124,423 A | 6/1992 | Leibfried | 528/15 |
| 5,147,945 A | 9/1992 | Woodside | 525/475 |
| 5,171,817 A | 12/1992 | Barnum et al. | 528/15 |
| 5,196,498 A | 3/1993 | Leibfried, Sr. | 528/15 |
| 5,242,979 A | 9/1993 | Barnum et al. | 525/106 |
| 5,254,655 A | 10/1993 | Gibbons et al. | 528/15 |
| 5,298,536 A | 3/1994 | Babcock et al. | 523/201 |
| 5,298,588 A | 3/1994 | Gibbons et al. | 528/15 |
| 5,334,688 A | 8/1994 | Loo | 528/15 |
| 5,340,644 A | 8/1994 | Babcock et al. | 428/285 |
| 5,373,077 A | 12/1994 | Loo | 528/15 |
| 5,412,055 A | 5/1995 | Loo | 528/15 |
| 5,466,512 A | 11/1995 | Babcock et al. | 428/209 |
| 5,466,728 A | 11/1995 | Babcock et al. | 523/179 |
| 5,605,726 A | 2/1997 | Gibbons et al. | 428/1 |
| 5,663,308 A | 9/1997 | Gibbons et al. | 534/573 |
| 5,714,304 A | 2/1998 | Gibbons et al. | 430/270.11 |
| 6,013,715 A * | 1/2000 | Gornowicz et al. | 524/492 |
| 6,150,464 A * | 11/2000 | Medsker et al. | 525/101 |
| 6,187,890 B1 * | 2/2001 | Fehn et al. | 528/15 |
| 6,252,030 B1 * | 6/2001 | Zank et al. | 528/31 |
| 6,388,005 B1 * | 5/2002 | Morita et al. | 524/837 |
| 6,451,909 B1 * | 9/2002 | Herzig et al. | 524/837 |
| 2003/0055194 A1 * | 3/2003 | Herzig et al. | 528/10 |

FOREIGN PATENT DOCUMENTS

| | | | |
|---|---|---|---|
| DE | 4128932 | 3/1993 | C07F/7/10 |
| EP | 0388005 | 9/1990 | C08G/77/38 |
| EP | 0596646 | 5/1994 | C07F/7/14 |
| EP | 0904837 | 3/1999 | B01J/31/22 |

* cited by examiner

*Primary Examiner*—Jeffrey B. Robertson
(74) *Attorney, Agent, or Firm*—Patricia M. Scaduto

(57) ABSTRACT

A composition comprising (A) at least one organosiloxane resin having an average of at least two silicon-bonded hydrogen groups per molecule; (B) at least one polyene having an average of at least two non-aromatic carbon-carbon double bonds per molecule; and (C) a catalyst. Methods for preparing the above-described composition are also disclosed.

20 Claims, No Drawings

ORGANOSILOXANE RESIN-POLYENE MATERIALS

FIELD OF THE INVENTION

The present invention relates to a composition comprising (A) at least one organosiloxane resin having an average of at least two silicon-bonded hydrogen groups per molecule; (B) at least one polyene having an average of at least two non-aromatic carbon-carbon double bonds per molecule; and (C) a catalyst. Methods for preparing the above-described composition are also disclosed.

BACKGROUND OF THE INVENTION

Compositions have been previously described which have been prepared by reacting Si—H containing linear polysiloxanes, cyclosiloxanes, and/or tetrahedral siloxysilanes with polyenes. While these compositions had certain useful properties, at high temperatures they tended to degrade and their glass transition temperature (Tg) and modulus values were either too high resulting in stress-induced failures in die-attach adhesive and coating applications or too low resulting in poor adhesive strength and scratch or mar resistance. The present invention utilizes an organosiloxane resin containing silicon-bonded hydrogen groups which when reacted with a polyene having non-aromatic carbon-carbon double bonds provides a reaction product with improved thermal stability as well as Tg and modulus values that are attractive for low stress die attach applications.

SUMMARY OF THE INVENTION

The present invention relates to a composition comprising (A) at least one organosiloxane resin having an average of at least two silicon-bonded hydrogen groups per molecule; (B) at least one polyene having an average of at least two non-aromatic carbon-carbon double bonds per molecule; and (C) a catalyst. Methods for preparing the above-described composition are also disclosed.

DETAILED DESCRIPTION OF THE INVENTION

One embodiment of the present invention is a composition comprising (A) at least one organosiloxane resin comprising siloxane units having an empirical formula $H_a R^1{}_b R^2{}_c SiO_{(4-a-b-c)/2}$, where each $R^1$ and $R^2$ is an independently selected alkyl group comprising 1 to 4 carbon atoms or an aryl group comprising 6 to 8 carbon atoms, subscript a>0, subscripts b and c are each 0 or a positive number with the proviso that $1.3<(a+b+c)<2.0$, and there are an average of at least two silicon-bonded hydrogen groups per molecule; (B) at least one polyene having an average of at least two non-aromatic carbon-carbon double bonds per molecule; and (C) a catalyst.

Component (A) comprises at least one organosiloxane resin comprising units having an empirical formula (I) $H_a R^1{}_b R^2{}_c SiO_{(4-a-b-c)/2}$, where each $R^1$ and $R^2$ is an independently selected alkyl group comprising 1 to 4 carbon atoms or an aryl group comprising 6 to 8 carbon atoms, subscript a>0, subscripts b and c are each 0 or a positive number with the proviso that $1.3<(a+b+c)<2.0$, and there are an average of at least two silicon-bonded hydrogen groups per molecule. Component (A) may be a single organosiloxane resin or a mixture of different organosiloxane resins.

As used herein, the term "organosiloxane resin" means a material which may comprise siloxane units described by $R_3SiO_{1/2}$ (M units), $R_2SiO_{2/2}$ (D units), $RSiO_{3/2}$ (T units), and $SiO_{4/2}$ (Q units), where each R describes a hydrogen atom, or a $R^1$ or $R^2$ group, provided there are an average of at least two silicon-bonded hydrogen groups per organosiloxane resin molecule. These silicon-bonded hydrogen groups may be present on the M, D, and/or T units in the organosiloxane resin molecule. Alternatively, these silicon-bonded hydrogen groups may be present on the M and/or D units in the organosiloxane resin molecule. Generally, there will be only one hydrogen atom bonded to a silicon atom.

There are an average of at least two silicon-bonded hydrogen groups per organosiloxane resin molecule. Alternatively, there are an average of at least three silicon-bonded hydrogen groups per organosiloxane resin molecule.

Each $R^1$ and $R^2$ of empirical formula (I) is an independently selected alkyl group comprising 1 to 4 carbon atoms or an aryl group comprising 6 to 8 carbon atoms. The alkyl groups and aryl groups represented by $R^1$ and $R^2$ may be substituted with halogen atoms or unsubstituted. Examples of alkyl groups represented by $R^1$ and $R^2$ include methyl, ethyl, propyl, isopropyl, butyl, isobutyl, 3,3,3-trifluoropropyl, chloromethyl, and cyclobutyl. Examples of aryl groups represented by $R^1$ and $R^2$ include phenyl, benzyl, and tolyl. Alternatively, greater than 60 mole percent of the $R^1$ and $R^2$ groups are independently selected alkyl groups comprising 1 to 4 carbon atoms. Alternatively, greater than 75 mole percent of the $R^1$ and $R^2$ groups are methyl groups.

Subscript a>0 and subscripts b and c of empirical formula (I) are each 0 or a positive number, provided the sum of a+b+c is in the range $1.3<(a+b+c)<2$. This range of (a+b+c) for component (A) allows for various mixtures of the M, D, T, and Q units provided the overall mixture of units falls in the specified range. Alternatively, the sum of a+b+c can be in the range $1.5<(a+b+c)<1.8$.

The organosiloxane resin of component (A) may have hydroxy groups and/or alkoxy groups present in the molecule provided they do not interfere with the hydrosilylation. Alternatively, the hydroxy and alkoxy contents of the organosiloxane resin are both less than 6 weight percent.

The organosiloxane resins useful in this invention may be prepared by methods well known in the art. For example, the organosiloxane resins may be prepared by acid-catalyzed hydrolytic polycondensation of alkoxysilanes.

Component (B) comprises at least one polyene having an average of at least two non-aromatic carbon-carbon double bonds per molecule. Component (B) may be a single polyene or a mixture of different polyenes.

The polyenes useful in the present invnetion are compounds comprising an average of at least two non-aromatic, carbon-carbon double bonds per molecule. Alternatively, the polyenes are compounds comprising from two to four non-aromatic carbon-carbon double bonds per molecule. The polyene can have a monomeric structure or oligomeric structure having up to 100 repeating units. The polyenes can be cyclic or polycyclic with the non-aromatic, carbon-carbon double bonds situated within the cyclic structure, attached as side groups or both. Although the polyenes are generally hydrocarbons, polyenes containing other atoms including but not limited to oxygen and nitrogen may also be used.

Examples of useful cyclic polyenes include cyclobutadiene, cyclopentadiene, cyclohexadiene, norbornadiene, and bismaleimides such as N,N'-p-phenylenebismaleimide.

Examples of useful polycyclic polyenes include cyclopentadiene oligomers such as dicyclopentadiene, tricyclopentadiene and tetracyclopentadiene, norbornadiene dimer, dimethanohexahydronaphthalene, bicycloheptadiene (i.e., norbornadiene) and its Diels-Alder oligomers with cyclopentadiene (e.g., dimethanohexahydronaphthalene), and substituted derivatives of any of these, e.g., methyl dicyclopentadienes.

Although not critical, the present composition comprises 10 to 75 parts by weight of component (B) per 100 parts by weight of component (A). Alternatively, the present composition comprises 20 to 50 parts of component (B) on the same basis. The polyenes of Component (B) are commercially available or may be made by methods known in the art.

Of course, it is generally understood that for crosslinking to occur, the sum of the average number of silicon-bonded hydrogen atoms per molecule in component (A) and the average number of carbon-carbon double bonds per molecule in component (B) must be greater than four. The ratio of silicon-bonded hydrogen groups in component (A) to the carbon-carbon double bonds in component (B) can be from 1:0.5 to 1:1.5. Alternatively, the ratio of silicon-bonded hydrogen groups in component (A) to the carbon-carbon double bonds in component (B) can be from 1:0.8 to 1:1.2.

The polyenes useful in the present invention have an average of at least two non-aromatic carbon-carbon double bonds per molecule. Depending on the desired composition, the polyene can have at least two non-aromatic carbon-carbon double bonds having very similar reactivities or having chemically distinguishable reactivities. As used herein, "very similar reactivities" means that the non-aromatic carbon-carbon double bonds will undergo hydrosilylation with the silicon-bonded hydrogen groups on the organosiloxane resin under similar reaction conditions and at the same rate. Also as used herein, the term "chemically distinguishable reactivities" means that at least two non-aromatic carbon-carbon double bonds in the polyene molecule have widely different rates of reaction in hydrosilylation and one or more of the double bonds of a polyene molecule will undergo hydrosilylation with silicon-bonded hydrogen groups on the organosiloxane resin prior to substantial reaction of the other double bonds of that polyene molecule.

When the polyene comprises at least two non-aromatic carbon-carbon double bonds per molecule having very similar reactivities, the double bonds can be found next to two bridgehead positions in a strained polycyclic aliphatic ring structure, or in a strained cyclic ring structure (e.g. cyclobutadiene ring). Examples of polyenes having at least two two non-aromatic carbon-carbon double bonds with very similar reactivities include 5-vinyl-2-norbornene, o-, m-, or p-diisopropenylbenzene, o-, m-, or p-divinylbenzene, diallyl benzene, dimethanohexahydronaphthalene and the symmetrical isomer of tricyclopentadiene.

Alternatively, when the polyene comprises at least two non-aromatic carbon-carbon double bonds having chemically distinguishable reactivities, the reactive double bond can be found either next to two bridgehead positions in a strained polycyclic aliphatic ring structure or in a strained cyclic ring structure (e.g. cyclobutadiene ring). The other carbon-carbon double bond(s) may be any other non-aromatic, 1,2-disubstituted non-conjugated carbon-carbon double bond that is not next to two bridgehead positions in a strained polycyclic aliphatic ring structure nor a strained cyclic ring structure (e.g. cyclobutadiene ring). Examples of polyenes having chemically distinguishable reactivities are dicyclopentadiene, the asymmetrical isomer of tricyclopentadiene, and methyl dicyclopentadiene.

The benefit of using polyenes comprising at least two non-aromatic carbon-carbon double bonds having chemically distinguishable reactivities is that a "prepolymer composition" can be formed. This prepolymer composition comprises a prepolymer and catalyst which can then be further reacted at a later time by utilizing reaction conditions, such as elevated temperatures, which will cause the less reactive non-aromatic carbon-carbon double bond(s) to react. As used herein, the term "prepolymer" means the partial reaction product of Components (A) and (B) (and any reactive optional ingredients) which can then react to higher molecular weights or crosslink to a cured composition when more severe reaction conditions are applied.

Component (C) comprises any catalyst typically employed for hydrosilylation reactions. It is preferred to use platinum group metal-containing catalysts. By "platinum group" it is meant ruthenium, rhodium, palladium, osmium, iridium and platinum and complexes thereof. Platinum group metal-containing catalysts useful in preparing the compositions of the present invention include the platinum complexes prepared as described by Willing, U.S. Pat. No. 3,419,593, and Brown et al, U.S. Pat. No. 5,175,325, each of which is hereby incorporated by reference to show such complexes and their preparation. Other examples of useful platinum group metal-containing catalysts can be found in Lee et al., U.S. Pat. No. 3,989,668; Chang et al., U.S. Pat. No. 5,036,117; Ashby, U.S. Pat. No. 3,159,601; Lamoreaux, U.S. Pat. No. 3,220,972; Chalk et al., U.S. Pat. No. 3,296,291; Modic, U.S. Pat. No. 3,516,946; Karstedt, U.S. Pat. No. 3,814,730; and Chandra et al., U.S. Pat. No. 3,928,629 all of which are hereby incorporated by reference to show useful platinum group metal-containing catalysts and methods for their preparation. When platinum is the metal of choice, the catalyst can be platinum metal, platinum metal deposited on a carrier such as silica gel or powdered charcoal, or a compound or complex of a platinum group metal. Alternatively, the catalyst can include chloroplatinic acid, either in hexahydrate form or anhydrous form, and a catalyst which can be obtained by reacting chloroplatinic acid with an aliphatically unsaturated organosilicon compound such as divinyltetramethyldisiloxane, or alkene-platinum-silyl complexes as described in U.S. patent application Ser. No. 10/017,229, filed Dec. 7, 2001, and issued Aug. 12, 2003 as U.S. Pat. No. 6,605,734, such as $(COD)Pt(SiMeCl_2)_2$, where COD is 1,5-cyclooctadiene and Me is methyl. These alkene-platinum-silyl complexes may be prepared, for example by mixing 0.015 mole $(COD)PtCl_2$ with 0.045 mole COD and 0.0612 moles $HMeSiCl_2$.

The appropriate amount of the catalyst will depend upon the particular catalyst used. The platinum catalyst should be present in an amount sufficient to provide at least 1 part per million (ppm), alternatively 2 to 200 ppm of platinum in each case based on the total weight of Components (A) and (B). The catalyst may be added as a single species or as a mixture of two or more different species.

The compositions of the present invention may also comprise (D) at least one inhibitor. This optional component (D) can be any material that is known to be, or can be, used to inhibit the catalytic activity of platinum group metal-containing catalysts. As used herein, the term "inhibitor" means a material that retards activity of a catalyst at room temperature but does not interfere with the properties of the catalyst at some elevated temperatures. Generally, the inhibitor can be added at any time prior to the final cure step. Alternatively, when polyenes having non-aromatic, carbon carbon double bonds with different reactivities are used, the inhibitor may be added after the prepolymer is formed so to make it more shelf stable until the final cure conditions are applied. Suitable inhibitors include ethylenically or aromatically unsaturated amides, acetylenic compounds, silylated acetylenic compounds, ethylenically unsaturated isocyanates, olefinic siloxanes, unsaturated hydrocarbon monoesters and diesters, conjugated ene-ynes, hydroperoxides, nitriles, and diaziridines.

Examples of acetylenic alcohols include 1-ethynyl-1-cyclohexanol, 2-methyl-3-butyn-2-ol, 2-phenyl-3-butyn-2-ol, 2-ethynyl-isopropanol, 2-ethynyl-butane-2-ol, and 3,5-dimethyl-1-hexyn-3-ol, silylated acetylenic alcohols exemplified by trimethyl (3,5-dimethyl-1-hexyn-3-oxy) silane, dimethyl-bis-(3-methyl-1-butyn-oxy)silane, methylvinylbis(3-methyl-1-butyn-3-oxy)silane, and ((1,1-dimethyl-2-propynyl)oxy)trimethylsilane. Examples of unsaturated carboxylic esters include diallyl maleate, dimethyl maleate, diethyl fumarate, diallyl fumarate, and bis-2-methoxy-1-methylethylmaleate, mono-octylmaleate, mono-isooctylmaleate, mono-allyl maleate, mono-methyl maleate, mono-ethyl fumarate, mono-allyl fumarate, and 2-methoxy-1-methylethylmaleate. Examples of conjugated ene-ynes include 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, and 3-phenyl-3-butene-1-yne. Examples of olefinic siloxanes include 1,3,5,7-tetramethyl-1,3,5,7-tetravinylcyclotetrasiloxane, and a mixture of a conjugated ene-yne as described above and a vinylcyclosiloxane as described above.

Alternatively, useful inhibitors include diallyl maleate, bis-2-methoxy-1-methylethylmaleate, 1-ethynyl-1-cyclohexanol, and 3,5-dimethyl-1-hexyn-3-ol.

When used in the present composition from 0.03 to 10 parts by weight of the inhibitor based on the total weight of Components (A), (B) and (C) can be added. The inhibitor may be added as a single species or as a mixture of two or more different species.

The compositions of the present invention may also comprise (E) at least one reinforcing compound, generally added to improve toughness. Examples of useful reinforcing compounds include hydrocarbon elastomers having a molecular weight of less than 100,000, siloxane elastomers having a molecular weight less than 50,000, and silicate-based siloxane resins having $R^3_3SiO_{1/2}$ (M units), and $SiO_{4/2}$ (Q units), where each $R^3$ group is independently selected from a monovalent hydrocarbon group or a hydrogen atom.

Examples of useful hydrocarbon elastomers include low molecular weight ethylene-propylene-diene terpolymers, low molecular weight butyl rubber, partially hydrogenated low molecular weight polyisoprene or natural rubber, and partially hydrogenated low molecular weight polybutadiene or styrene-butadiene copolymers.

Examples of useful siloxane elastomers include low molecular weight vinyl or SiH terminated polydimethylsiloxane, polydimethyl/diphenyl siloxane or polydimethyl/phenylmethyl siloxane copolymers.

Examples of useful silicate-based siloxane resins include MQ resins with M:Q ratios of from 0.6 to 0.9:1 where M consists primarily of trimethylsiloxy groups.

When used in the present composition, from 1 to 25 parts by weight of the reinforcing compound based on the total weight of Components (A), (B) and (C) may be added. The reinforcing compound may be added to the composition at any time prior to the final cure step. The reinforcing compound may be added as a single species or as a mixture of two or more different species.

The compositions of the present invention may also comprise (F) at least one filler. Useful fillers include carbon black, vermiculite, mica, wollastonite, calcium carbonate, silica, fused silica, fumed silica, glass spheres, glass beads, ground glass, glass flakes, waste glass and fiber reinforcements, such as those described in U.S. Pat. Nos. 4,900,779 and 4,902,731. Typical fibrous reinforcements include but are not limited to chopped glass, woven glass, nonwoven glass, and other typical composite fibers, such as ceramic, carbon (e.g., graphite), metallic and synthetic polymer fibers. Fillers can serve either for reinforcement or as extenders to reduce the cost of the composition.

When used in the present composition, the filler can be present in amounts from 5 to 50 parts by weight based on the total weight of Components (A), (B) and (C). The filler may be added to the composition at any time prior to the final cure step. Alternatively, when a prepolymer is to be formed, the filler may be added after the prepolymer is formed and prior to the final cure step. The filler may be added as a single species or as a mixture of two or more different species.

Other additional ingredients may also be added to the present composition provided that the properties of the composition are not significantly reduced. Examples of such ingredients include antioxidants, UV stabilizers, free-radical scavengers, and flow and leveling additives.

Components (A) and (B) can be chosen so that when the composition cures all or substantially all of the silicon-bonded hydrogen and/or carbon-carbon double bonds have reacted forming a network. This network will generally be a thermoset material that is no longer soluble in solvents and is in the form of a solid glass or elastomer. If the carbon-carbon double bonds present in component (B) have chemically distinguishable reactivities, a prepolymer composition can be prepared by reacting the more labile carbon-carbon double bond with the Si—H containing organosiloxane resin under mild conditions after which the prepolymer composition can be stored in a liquid or thermoplastic solid form with the catalyst still active until more severe temperature conditions are applied to complete the hydrosilylation reactions resulting in a cured material. It is understood that the compositions claimed as the present invention include compositions comprising the components as ingredients as well compositions comprising reaction products of the components.

Another embodiment of the present invention is a method of making the above described composition comprising the step of (i) mixing materials comprising
 (A) at least one organosiloxane resin comprising siloxane units having an empirical formula (I) $H_aR^1_bR^2_cSiO_{(4-a-b-c)/2}$ where each $R^1$ and $R^2$ is an independently selected alkyl group comprising 1 to 4 carbon atoms or an aryl group comprising 6 to 8 carbon atoms, subscript a>0, and subscripts b and c are each 0 or a positive number with the proviso that 1.3<(a+b+c)<2.0 and there are an average of at least two silicon-bonded hydrogen groups per molecule;
 (B) at least one polyene having an average of at least two non-aromatic carbon-carbon double bonds per molecule; and
 (C) a catalyst.

Depending on the reaction conditions and reactivities of the carbon-carbon double bonds, the components described above may react and the reaction product obtained can comprise a prepolymer composition or a cured composition.

When at least one polyene is utilized containing carbon-carbon double bonds having chemically distinguishable reactivities, a cured composition can also be formed in two or more steps.

A further embodiment is a method of forming a prepolymer composition comprising the step of
(i) mixing materials comprising
(A) at least one organosiloxane resin comprising siloxane units having an empirical formula (I) $H_aR^1_bR^2_cSiO_{(4-a-b-c)/2}$ where each $R^1$ and $R^2$ is an independently selected alkyl group comprising 1 to 4 carbon atoms or an aryl group comprising 6 to 8 carbon atoms, subscript a>0, and subscripts b and c are each 0 or a positive number with the proviso that $1.3<(a+b+c)<2.0$ and there are an average of at least two silicon-bonded hydrogen groups per molecule;
(B) at least one polyene having an average of at least two non-aromatic carbon-carbon double bonds per molecule with chemically distinguishable reactivities; and
(C) a catalyst.

A further embodiment of the present invention is a method of forming a cured composition comprising the steps of
(i) mixing materials comprising
(A) at least one organosiloxane resin comprising siloxane units having an empirical formula (I) $H_aR^1_bR^2_cSiO_{(4-a-b-c)/2}$ where each $R^1$ and $R^2$ is an independently selected alkyl group comprising 1 to 4 carbon atoms or an aryl group comprising 6 to 8 carbon atoms, subscript a>0, and subscripts b and c are each 0 or a positive number with the proviso that $1.3<(a+b+c)<2.0$ and there is an average of at least two silicon-bonded hydrogen groups per molecule;
(B) at least one polyene having an average of at least two non-aromatic carbon-carbon double bonds per molecule with chemically distinguishable reactivities; and
(C) a catalyst to form a prepolymer composition, and then
(iii) heating the prepolymer composition so to form a cured composition.

Components (A), (B), and (C) are as described above. The mixing can be done by any conventional means such as a motor driven stir rod with teflon paddle inside a round bottom flask or a magnetic stir bar in a round bottom flask driven by a magnetic stir plate. The conditions needed for curing the prepolymer composition will vary depending on the ingredients used but generally the prepolymer composition will need to be heated for times and temperatures to assure the remaining carbon-carbon double bonds are reacted, for example from 100° C. to 300° C. for from 10 minutes to 10 hours. Alternatively, the prepolymer can be heated from 150° C. to 250° C. for from 0.5 to 7 hours. The prepolymer composition formed by these methods can be used immediately or stored prior to use. When the prepolymer composition is to be further reacted at a later date, an alternative method may include a step (ii) adding an inhibitor so to stabilize the prepolymer composition.

The prepolymer compositions are useful as one part adhesives, encapsulants, or coatings, that can be applied or shaped as a liquid and then cured to a thermoset material at elevated temperatures. Because the material does not emit a by-product during cure both thin and thick section applications can be pursued. By using organosiloxane resins as described above for Component (A), thermoset materials can be prepared which have low weight loss under severe conditions and are also attractive for electronic and high temperature coating applications.

EXAMPLES

The following examples are disclosed to further teach, but not limit, the invention, which is properly delineated by the appended claims. As used herein, Me means methyl, Ph means phenyl.

Test Methods

Silicon-29 Nuclear Magnetic Resonance Spectroscopy ($^{29}$Si NMR)

Solution state $^{29}$Si NMR spectroscopy was performed on a Varian 400 MHz NMR spectrometer with a 16 mm Si-free probe tuned to 79.458 MHz. Gated decoupling, a 90° pulse width, and a relaxation delay time of 7.60 seconds (at=1.6 s, d1=6.0 s) were used in the experiments. The samples were prepared with 0.02 M chromium(II) acetylacetonate in approximately 33 volume % in CDCl3 or approximately 75 volume % in C6D6. Chemical shifts are reported relative to the 0.0 ppm tetramethylsilane peak (external standard). From 64 to 512 transients were signal-averaged.

Non-volatile Content (NVC)

A 1.5 gram sample of material in a 2-inch diameter aluminum weighing dish was placed in a 150° C. forced air oven for one hour, then re-weighed. The amount of residue as a percentage of the original sample is reported as the NVC.

Dynamic Mechanical Thermal Analysis (DMTA)

Dynamic mechanical thermal analysis was conducted using a Rheometric Scientific RDAII equipped with rectangular torsion fixtures. Rectangular test specimens were cut such that thickness ranged from 1.4 to 1.6 mm, the width was between 6 and 7 mm, and the free length was from 24 to 28 mm. A dynamic frequency of 1 Hz and a heating rate of 2° C./min were applied. A strain sweep was conducted at the starting temperature (−102° C.) to determine an appropriate strain to measure the linear viscoelastic properties; the dynamic strain ranged from 0.012 to 0.040%. The autostrain (5% increments) and autotension options were used. The tool expansion was based on 2.12 $\mu$m/° C. The dynamic mechanical properties were measured using a single heating cycle over a temperature range of −100–250° C. The shear storage modulus (G') at 25° C. and the plateau modulus ($G_N$) (G' measured at a temperature approximately 50° C. above the glass transition temperature) were both recorded.

Thermogravimetric Analysis (TGA)

Thermogravimetric analysis was performed using a TA Instruments TGA 2950. Approximately 7 to 12 mg of a single piece of the test specimen was placed in a Pt pan and heated to 1000° C. at 10° C./min under an air atmosphere. The uncertainty was estimated to be ±5% based on duplicate analysis. The % weight loss measured on a single heating scan at 250° C., 500° C., 750° C., and 1000° C. were recorded.

Preparation of Resins

Resin A: A flask was charged with phenyltrimethoxysilane (2379.5 g), methyltrimethoxysilane (1634.6 g) and trifluoromethanesulfonic acid (2.3 g). Deionized water (500.9 g) was added dropwise. Volatiles (282 g) were removed via distillation, then the reaction mixture cooled to 46° C. Tetramethyldisiloxane (1316.4 g) were added over 19 minutes, then acetic acid (588.6 g) added over 9 minutes. The mixture was heated to 50° C. for three hours after which volatiles (754.4 g) were removed at ~70° C. via distillation. After cooling to 57° C., saturated aqueous sodium bicarbonate (3000 g) and heptane (1800 g) were added and the mixture stirred for one hour. The aqueous phase was removed via a bottom drain valve and the organic phase washed with deionized water (3×2400 mL), then solvent was removed on a rotary evaporator. Filtration produced 3385 g of a clear, colorless liquid. NVC (1.5 g/Al pan/150° C./1 h): 95.8%. $^{29}$Si NMR indicated a composition of $(Me_2HSiO_{1/2})_{0.4}(MeSiO_{3/2})_{0.3}$ $(PhSiO_{3/2})_{0.3}$ with 0.031 mol OMe/mol Si and 0.0012 mol OH/mol Si. The value of (a+b+c) and the mol % $R^1$ and $R^2$ groups having carbon groups less than 4 (<$C_4$) are noted in Table 1.

Resin B: A flask was charged with methyltrimethoxysilane (3269.3 g) and trifluoromethanesulfonic acid (2.6 g). Deionized water (432.4 g) was added over 18 min. Volatiles (876.9 g) were removed via distillation, then the reaction mixture cooled to 40° C. Tetramethyldisiloxane (1612.0 g) was added over 11 minutes, then deionized water (216.2 g) was added over 4 minutes. The mixture was heated to 50° C. for two hours, then stirred at ambient temperature for ~16 h after which volatiles (806 g) were removed at ~70° C. via distillation. After cooling to 45° C., saturated aqueous sodium bicarbonate (3000 g) and heptane (1800 g) were added and the mixture stirred for one hour at ambient temperature. The aqueous phase was removed via a bottom drain valve and the organic phase washed with deionized water (3×2000 mL), then solvent was removed on a rotary evaporator. Filtration produced 2461.5 g of a clear, colorless liquid. NVC (1.5 g/Al pan/150° C./1 h): 74.9%. $^{29}$Si NMR indicated a composition of $(Me_2HSiO_{1/2})_{0.42}(MeSiO_{3/2})_{0.58}$ with 0.056 mol OMe/mol Si and 0.016 mol OH/mol Si. The value of (a+b+c) and the mol % $R^1$ and $R^2$ groups having carbon groups less than 4 (<$C_4$) are noted in Table 1.

Resin C: A reactor was charged with tetramethyldisiloxane (16 parts) and deionized water (8 parts). Concentrated hydrochloric acid (5.35 parts) was slowly added to the reactor, then methanol (0.65 parts) was added. Tetramethoxysilane (20 parts) was slowly added to the mixture followed by additional deionized water (16.7 parts). The mixture was stirred for 5 min. The bottom siloxane phase was removed and hexane (16.67 parts) added to the reactor. The aqueous phase was removed. The siloxane and hexane materials were mixed and washed with additional deionized water (16.67 parts), followed by removal of all volatiles via distillation under reduced pressure to yield a product shown by $^{29}$Si NMR to be $(Me_2HSiO_{1/2})_{0.63}(SiO_{4/2})_{0.37}$ containing OH and OMe at a combined level of 0.039 mol/mol Si.

Resin D: A flask was charged with methyltrimethoxysilane (118.1 g) and trifluoromethanesulfonic acid (0.06 g). Deionized water (15 g) was added rapidly, then the mixture heated to reflux (68° C.) for 30 min. The reaction mixture was cooled to 50° C. before a mixture of tetramethyldisiloxane (23.2 g) and methylhydridocyclosiloxanes (17.4 g) was added rapidly, followed by addition of deionized water (8.3 g). The mixture was heated briefly to reflux, then stirred at 50° C. for 1.3 hours. Caprolactam (0.005 g) was added and the mixture stirred at ambient temperature for 30 min. Toluene (120 g) was added, then volatiles (~135 mL) were removed via distillation and replaced by additional toluene (~135 mL). The aqueous phase was removed and the organic phase washed with saturated aqueous sodium bicarbonate (100 mL) and deionized water (3×100 mL). Residual water was removed via azeotrope, then solvent was removed on a rotary evaporator. Filtration produced 92.1 g of a clear, colorless liquid. $^{29}$Si NMR indicated a composition of $(Me_2HSiO_{1/2})_{0.17}(MeHSiO_{2/2})_{0.21}$ $(MeSiO_{3/2})_{0.62}$ with 0.113 mol OMe/mol Si and 0.009 mol OH/mol Si. The value of (a+b+c) and the mol % $R^1$ and $R^2$ groups having carbon groups less than 4 (<$C_4$) are noted in Table 1.

Resin E: A flask was charged with phenyltrimethoxysilane (4752 g) and trifluoromethanesulfonic acid (2.2 g). Deionized water (500.9 g) was added over 7.5 min. Volatiles (1105.1 g) were removed via distillation, then the reaction mixture cooled to 45° C. Tetramethyldisiloxane (1316.4 g) was added over 23 minutes, then acetic acid (588.6 g) added over 8.3 minutes. The mixture was heated to 50° C. for three hours, then stirred at ambient temperature for ~16 h after which volatiles (653.8 g) were removed at ~70° C. via distillation. After cooling to 57° C., saturated aqueous sodium bicarbonate (3000 g) and heptane (1800 g) were added and the mixture stirred for one hour at ambient temperature. The aqueous phase was removed and the organic phase washed with deionized water (3×3600 mL), then solvent was removed on a rotary evaporator. Filtration produced 4050.3 g of a clear, colorless liquid. NVC (1.5 g/Al pan/150° C./1 h): 99.4%. $^{29}$Si NMR indicated a composition of $(Me_2HSiO_{1/2})_{0.4}(PhSiO_{3/2})_{0.6}$ with 0.020 mol OMe/mol Si and 0.058 mol OH/mol Si. The value of (a+b+c) and the mol % $R^1$ and $R^2$ groups having carbon groups less than 4 (<$C_4$) are noted in Table 1.

Resin F: A flask was charged with tetramethyldisiloxane (301.7 g) and deionized water (199.8 g) cooled in an ice/water bath. A mixture of additional tetramethyldisiloxane (301.7 g) and tetrachlorosilane (95.7 g) was added dropwise over 24 min. The ice bath was removed and the mixture stirred for 30 min. The mixture was transferred to a separatory funnel and the aqueous phase removed. The organic phase was washed (with 200 mL each) alternately with deionized water, saturated aqueous sodium bicarbonate, deionized water and more bicarbonate solution, then dried over magnesium sulfate and filtered. Distillation of the product (99–100° C. at 1.5 mmHg) yielded a middle cut (74.5 g) of a clear, colorless liquid shown by GC-FID to be 99.8 area % desired product. $^{29}$Si NMR indicated >99% pure $(Me_2HSiO_{1/2})_{0.8}(SiO_{4/2})_{0.2}$ The value of (a+b+c) and the mol % $R^1$ and $R^2$ groups having carbon groups less than 4 (<$C_4$) are noted in Table 1.

Resin G: A flask was charged with methyltrimethoxysilane (495.8 g), tetramethyldisiloxane (545.4 g), and 0.92 g of trifluoromethanesulfonic acid. 404.7 g deionized water was added maintaining flask temperature at ~50° C. with water addition rate and ice-bath cooling. Following the 40-minute addition, the reaction mixture was maintained at 50° C. for 3 hours. $CaCO_3$ (0.4 g) was added; reaction was allowed to stir overnight at room temperature. The aqueous phase was removed. To the organic phase was added 60 g deionized water and 100 g toluene and the volatiles were removed by heating to a temperature of 125° C. Yield=715.8 g. Product was a clear colorless liquid. $^{29}$Si NMR indicated a composition of $(Me_2HSiO_{1/2})_{0.68}(MeSiO_{3/2})_{0.32}$. By $^{13}$C NMR the product was determined to have 0.03 mol OMe/mol Si and 0.02 mol OH/mol Si. The value of (a+b+c) and the mol % $R^1$ and $R^2$ groups having carbon groups less than 4 (<$C_4$) are noted in Table 1.

Resin H: A flask was charged with phenyltrimethoxysilane (243.9 g), methyltrimethoxysilane (336.6 g) and trifluoromethanesulfonic acid (0.29 g). Deionized water (43.2 g) was added rapidly with stirring. Volatiles (113.7 g) were removed via distillation, then the reaction mixture cooled to 62° C. Tetramethyldisiloxane (423.1 g) was, added, then acetic acid (189.2 g). The mixture was heated to 50–55° C. for three hours, after which volatiles (259 g) were removed via distillation. Heptane (914 g) and saturated aqueous sodium bicarbonate (350 g) were added and the mixture stirred for thirty minutes. The aqueous phase was removed and the organic phase washed with deionized water (3×200 mL), then dried over magnesium sulfate and filtered. Solvent was removed on a rotary evaporator to yield 603.8 g of a clear, colorless low viscosity liquid. NVC (1.5 g/Al pan/ 150° C./1 h): 31.9%. $^{29}$Si NMR indicated a composition of $(Me_2HSiO_{1/2})_{0.59}(MeSiO_{3/2})_{0.27}(PhSiO_{3/2})_{0.14}$ with 0.044 mol OMe/mol Si and 0.009 mol OH/mol Si. The value of (a+b+c) and the mol % $R^1$ and $R^2$ groups having carbon groups less than 4 (<$C_4$) are noted in Table 1.

Si—H Cyclics: Tetramethyleyclotetrasiloxane
Si—H Linears: Dow Corning® 5-0210 Fluid, a linear methylhydrogen siloxane polymer.

EXAMPLES

Example 1

A flask was charged with 16 mg of chloroplatinic acid and 29.2 g dicyclopentadiene under oxygen free conditions. The flask contents were gently heated to 60° C. for 30 minutes, stirring under a $N_2$ blanket. 100 g of Resin A (~1:1 mol Si—H:C=C) was added quickly to the flask and an exotherm to 149° C. was observed 3 minutes after the addition was complete. 128.89 g of a straw-colored, transparent, high viscosity oil was obtained. This oil was determined by $^{29}$Si NMR to be an alkenyl functional material having an average composition described by $(Me_2HSiO_{1/2})_{0.15}(Me_2RSiO_{1/2})_{0.22}(MeSiO_{3/2})_{0.31}(PhSiO_{3/2})_{0.32}$, where R denoted a mono-hydrosilylation product of dicyclopentadiene.

This alkenyl functional material was poured into a Teflon mold with mild heat (heat gun) applied to assist flow. The material was de-gassed for 19 hours at 65° C. in a vacuum oven. The oven was returned to atmospheric pressure using $N_2$ gas and the sample was cured for 4 hours at 150° C. and 2 hours at 200° C. followed by a slow cool to ambient conditions. A transparent, light straw colored, tough, glass slab resulted. The material was evaluated using Dynamic Mechanical Thermal Analysis (DMTA) and Thermogravimetric Analysis (TGA). The results can be found in Table 2.

Example 2

A flask was charged with 9 mg of chloroplatinic acid and 32.95 g dicyclopentadiene under oxygen free conditions. The flask contents were gently heated to 60° C. for one hour, stirring under a $N_2$ blanket. 82.27 g of Resin B (~1:1 mol Si—H:C=C) was added quickly to the flask via an addition funnel. An exotherm to 137° C. was observed 3 minutes after the addition was complete. 115.0 g of a straw-colored transparent oil was obtained. This oil was determined by $^{29}$Si NMR to be an alkenyl functional material having an average composition described by $(Me_2HSiO_{1/2})_{0.21}(Me_2RSiO_{1/2})0.21(MeSiO_{3/2})_{0.58}$, where R denotes a mono-hydrosilylation product of dicyclopentadiene.

This alkenyl functional material was poured into a Teflon mold and de-gassed for 2.5 hours at 65° C. under vacuum. The oven was returned to atmospheric pressure using $N_2$ gas and the sample was cured for four hours at 150° C. and 2 hours at 200° C. followed by a slow cool to ambient conditions. A transparent, light straw-colored tough, glass slab resulted. The material was evaluated using DMTA and TGA. The results are depicted in Table 2.

Example 3

A flask was charged with 13 mg of chloroplatinic acid and 49.19 g dicyclopentadiene under oxygen free conditions. The flask contents were gently heated to 60–70° C. for one hour, stirring under a $N_2$ blanket. 75 g of Resin C (~1:1 mol Si—H:C=C) was added quickly to the flask using an addition funnel. An exotherm to 165° C. was observed 9 minutes after the addition was complete. 123.25 g of a straw-colored transparent oil was obtained. This oil was determined by $^{29}$Si NMR to be an alkenyl functional material having an average composition described by $(Me_2HSiO_{1/2})_{0.42}(Me_2RSiO_{1/2})_{0.20}(SiO_{4/2})_{0.38}$, where R denotes a mono-hydrosilylation product of dicyclopentadiene.

This alkenyl functional material was poured into a Teflon mold and de-gassed for 1.5 hours at 65° C. under vacuum. The oven was returned to atmospheric pressure using N2 gas and the sample was cured for four hours at 150° C. and 2 hours at 200° C. followed by a slow cool to ambient conditions. A transparent, straw-colored brittle glass slab resulted. The material was evaluated using DMTA and TGA. The results are depicted in Table 2.

Example 4

A flask was charged with 9 mg of chloroplatinic acid and 21.80 g dicyclopentadiene under oxygen free conditions. The flask contents were gently heated to 60–70° C. for one hour, stirring under a $N_2$ blanket. 60.55 g of Resin D (~1:1 mol Si—H:C=C) was added to the flask using an addition funnel. Reaction mixture was heated to 150° C. and a gray-colored oil was obtained. This oil was determined by $^{29}$Si NMR to be an alkenyl functional material having an average composition described by $(Me_2HSiO_{1/2})_{0.09}(Me_2RSiO_{1/2})_{0.08}(HMeSiO_{2/2})_{0.14}(MeRSiO_{2/2})_{0.06}(MeSiO_{0.63}$, where R denotes a mono-hydrosilylation product of dicyclopentadiene.

The alkenyl functional material was poured into a Teflon mold and de-gassed for 1.5 hours at 65° C. under vacuum. The oven was returned to atmospheric pressure using $N_2$ gas and the sample was cured for four hours at 150° C. and 2 hours at 200° C. followed by a slow cool to ambient conditions. A transparent, straw-colored rigid leather-like slab resulted. The material was evaluated using DMTA and TGA. The results are depicted in Table 2.

Example 5

A flask was charged with 15 mg of chloroplatinic acid and 31.3 g dicyclopentadiene under oxygen free conditions. The flask contents were gently heated to 64° C. for one hour, stirring under a $N_2$ blanket. 118.7 g of the Resin E (~1:1 mol Si—H:C=C) was added quickly to the flask using an addition funnel. An exotherm to 140° C. was observed 1 minute after the addition was complete. 149.75 g of a straw-colored, transparent, viscous oil was obtained. This oil was determined by $^{29}$Si NMR to be an alkenyl functional material having an average composition described by $(Me_2HSiO_{1/2})_{0.18}(Me_2RSiO_{1/2})_{0.21}(MeSiO_{3/2})_{0.61}$, where R denotes a mono-hydrosilylation product of dicyclopentadiene.

This alkenyl functional material was poured into a Teflon mold and de-gassed for 19 hours at 65° C. under vacuum. The oven was returned to atmospheric pressure using $N_2$ gas and the sample was cured for four hours at 150° C. and 2 hours at 200° C. followed by a slow cool to ambient conditions. A transparent, straw-colored brittle glass slab resulted. The material was evaluated using DMTA and TGA. The results are depicted in Table 2.

Example 6A

A 500 mL 3-neck round bottom flask was charged with 19 mg of chloroplatinic acid and 83.9 g dicyclopentadiene under oxygen free conditions. The flask was equipped with a water-cooled condenser, thermometer, and magnetic stirring. The flask contents were gently heated to 50° C. for 2 hours, stirring under a $N_2$ blanket. 76.4 g of tetramethylcyclotetrasiloxane (~1:1 mol Si—H:C=C) was added quickly to the flask using an addition funnel. An exotherm to 155° C. was observed 59 minutes after the addition was complete. A light straw-colored transparent oil was obtained. This oil was determined by $^{29}$Si NMR to be an alkenyl functional material having an average composition described by $(HMeSiO_{2/2})_{0.55}(MeRSiO_{2/2})_{0.45}$, where R denotes a mono-hydrosilylation product of dicyclopentadiene.

This alkenyl functional material was poured into a Teflon mold and de-gassed for 19 hours at 65° C. under vacuum. The oven was returned to atmospheric pressure using $N_2$ gas and the sample was cured for four hours at 150° C. and 2 hours at 200° C. followed by a slow cool to ambient conditions. A transparent, straw-colored, tough, glass slab resulted. The material was evaluated using DMTA and TGA. The results are depicted in Table 2.

Example 6B

A separate sample was prepared following the same procedure as in Example 6A except for this time the liquid materials was de-gassed for only 1.5 hours at 65° C. prior to high temperature curing. A transparent, straw-colored, tough, glass slab resulted. This material was evaluated using DMTA and TGA. The results are depicted in Table 2.

Example 7

A flask was charged with 15 mg of chloroplatinic acid and 56.6 g dicyclopentadiene under oxygen free conditions. The flask contents were gently heated to 55° C. for one hour, stirring under a $N_2$ blanket. 67.3g of Silicone Resin F (~1:1 mol Si—H:C=C) was added quickly to the flask using an addition funnel. An exotherm to 141° C. was observed 29 minutes after the addition was complete. A straw-colored transparent oil was obtained. This oil was determined by $^{29}$Si NMR to be an alkenyl functional material having an average composition described by $(Me_2HSiO_{1/2})_{0.49}(Me_2RSiO_{1/2})_{0.31}(SiO_{4/2})_{0.20}$, where R denotes a mono-hydrosilylation product of dicyclopentadiene.

This alkenyl functional material was poured into a Teflon mold and de-gassed for 19 hours at 65° C. under vacuum. The oven was returned to atmospheric pressure using $N_2$ gas and the sample was cured for four hours at 150° C. and 2 hours at 200° C. followed by a slow cool to ambient conditions. A transparent, straw-colored elastomeric slab resulted. The material was evaluated using DMTA and TGA. The results are depicted in Table 2.

Example 8

A flask was charged with 10 mg of chloroplatinic acid and 34.7 g dicyclopentadiene under oxygen free conditions. The flask contents were gently heated to 60° C. for one hour, stirring under a $N_2$ blanket. 60.1 g of Resin G (~1:1 mol Si—H:C=C) was added quickly to the flask via an addition funnel. An exotherm to 154° C. was observed 25 minutes after the addition was complete. 89.5 g of a straw-colored transparent oil was obtained. This oil was determined by $^{29}$Si NMR to be an alkenyl functional material having an average composition described by $(Me_2HSiO_{1/2})_{0.34}(Me_2RSiO_{1/2})_{0.33}(MeSiO_{3/2})_{0.33}$, where R denotes a mono-hydrosilylation product of dicyclopentadiene.

This alkenyl functional material was poured into a Teflon mold and de-gassed for 1.5 hours at 65° C. under vacuum. The oven was returned to atmospheric pressure using $N_2$ gas and the sample was cured for four hours at 150° C. and 2 hours at 200° C followed by a slow cool to ambient conditions. A transparent, straw-colored, tacky elastomeric slab resulted. The material was evaluated using DMTA and TGA. The results are depicted in Table 2.

Example 9

A flask was charged with 2 drops of chloroplatinic acid and 55.97 g dicyclopentadiene under oxygen free conditions. The flask contents were gently heated to 65° C. over 30 minutes, stirring under a $N_2$ blanket. 30.0 g of Dow Corning® 5-0210 Fluid, methylhydrogen linears was added quickly to the flask. An exotherm to 160° C. was observed immediately. A light straw-colored transparent oil was obtained. This oil was determined by $^{29}$Si NMR to be an alkenyl functional material having an average composition described by $(Me_3SiO_{1/2})_{0.11}(MeHSiO_{1/2})_{0.34}(MeRSiO_{2/2})_{0.54}$, where R denotes a mono-hydrosilylation product of dicyclopentadiene.

This alkenyl functional material was poured into a Teflon mold and de-gassed for 1.5 hours at 65° C. under vacuum. The oven was returned to atmospheric pressure using $N_2$ gas and the sample was cured for four hours at 150° C. and 2 hours at 200° C. followed by a slow cool to ambient conditions. A transparent, straw-colored, rigid glass slab resulted. The material was evaluated using DMTA and TGA. The results are depicted in Table 2.

Example 10

A flask was charged with 12 mg of chloroplatinic acid and 37.38 g dicyclopentadiene under oxygen free conditions. The flask contents were gently heated to 60° C. for one hour, stirring under a $N_2$ blanket. 75.00 g of the Resin H (~1:1 mol Si—H:C=C) was added quickly to the flask using an addition funnel. An exotherm to 164° C. was observed 12 minutes after the addition was complete. 111.68 g of a straw-colored transparent oil was obtained. This oil was determined by $^{29}$Si NMR to be an alkenyl functional material having an average composition described by $(Me_2HSiO_{1/2})_{0.34}(Me_2RSiO_{1/2})_{0.23}(MeSiO_{3/2})_{0.28}(PhSiO_{3/2})_{0.15}$, where R denotes a mono-hydrosilylation product of dicyclopentadiene.

This alkenyl functional material was poured into a Teflon mold and de-gassed for 1.5 hours at 65° C. under vacuum. The oven was returned to atmospheric pressure using $N_2$ gas and the sample was cured for four hours at 150° C. and 2 hours at 200° C. followed by a slow cool to ambient conditions. A transparent, straw-colored, weak, tacky elastomeric slab resulted. The material was evaluated using DMTA and TGA. The results are depicted in Table 2.

TABLE 1

Description of Materials Used as Component (A)

| Resin | Empirical Formula | (a + b + c) value | Mol % $R^1$ & $R^2 < C_4$ group |
|---|---|---|---|
| Cyclics* | $(MeH\ SiO_{2/2})_{1.0}$ | 2 | 100 |
| Cyclics* | $(MeH\ SiO_{2/2})_{1.0}$ | 2 | 100 |
| Linears* | $(Me_3SiO_{1/2})_{0.05}(MeHSiO_{2/2})_{0.95}$ | 2.05 | 100 |
| F | $(Me_2HSiO_{1/2})_{0.8}(SiO_{4/2})_{0.2}$ | 2.4 | 100 |
| G | $(Me_2HSiO_{1/2})_{0.68}(MeSiO_{3/2})_{0.32}$ | 2.36 | 100 |
| H | $(Me_2HSiO_{1/2})_{0.59}(MeSiO_{3/2})_{0.27}(PhSiO_{3/2})_{0.14}$ | 2.1 | 92 |
| E | $(Me_2HSiO_{1/2})_{0.4}(PhSiO_{3/2})_{0.6}$ | 1.8 | 57 |
| A | $(Me_2HSiO_{1/2})_{0.4}(MeSiO_{3/2})_{0.3}(PhSiO_{3/2})_{0.3}$ | 1.8 | 79 |
| B | $(Me_2HSiO_{1/2})_{0.42}(MeSiO_{3/2})_{0.58}$ | 1.84 | 100 |
| C | $(Me_2HSiO_{1/2})_{0.63}(SiO_{4/2})_{0.37}$ | 1.95 | 100 |
| D | $(Me_2HSiO_{1/2})_{0.17}(MeHSiO_{2/2})_{0.21}(MeSiO_{3/2})_{0.62}$ | 1.55 | 100 |

*These materials are not resins

TABLE 2

Modulus and Thermogravimetric Analysis of Examples

| | | Shear Modulus | | Thermogravimetric Analysis | | | |
|---|---|---|---|---|---|---|---|
| | | G'(25° C.) | $G_n$ (T, ° C.) | Weight Loss in Air | | | |
| Example | Resin | GPa | MPa | 250° C. | 500° C. | 750° C. | 1000° C. |
| 6A | Cyclics* | 0.804 | 1.76 (223) | −0.2 | 12.6 | 56.8 | 58.0 |
| 6B | Cyclics* | Not tested | Not tested | −0.1 | 10.0 | 56.3 | 58.7 |
| 9 | Linears* | 0.759 | 4.30 (156) | −0.2 | 10.9 | 52.7 | 53.6 |
| 7 | F | 0.404 | 3.01 (127) | 0.0 | 32.0 | 75.5 | 75.7 |
| 8 | G | Not tested | Not tested | 1.1 | 38.9 | 67.8 | 68.0 |
| 10 | H | Not tested | Not tested | −0.6 | 18.6 | 58.3 | 58.6 |
| 5 | E | 0.575 | Not tested | −0.1 | 11.6 | 55.1 | 55.5 |
| 1 | A | 0.634 | 6.19 (180) | −0.1 | 12.5 | 47.0 | 47.3 |
| 2 | B | 0.504 | 6.68 (149) | −0.1 | 9.1 | 40.1 | 40.5 |
| 3 | C | 0.493 | 2.33 (210) | −0.1 | 9.3 | 43.7 | 44.2 |
| 4 | D | 0.337 | 23.8(184) | −0.1 | 12.3 | 29.3 | 30.1 |

*These materials are not resins

We claim:

1. A composition comprising
   (A) 100 parts per weight of at least one organosiloxane resin comprising siloxane units having an empirical formula (I) $H_aR^1_bR^2_cSiO_{(4-a-b-c)/2}$ where each $R^1$ and $R^2$ is an independently selected alkyl group comprising 1 to 4 carbon atoms or an aryl group comprising 6 to 8 carbon atoms, subscript a>0, and subscripts b and c are each 0 or a positive number, and optionally containing alkoxy and/or hydroxy groups, with the proviso that 1.3<(a+b+c)<2.0 and there is an average of at least two silicon-bonded hydrogen groups per molecule;
   (B) 20 to 75 parts by weight of at least one polyene having an average of at least two non-aromatic, carbon-carbon double bonds per molecule; and
   (C) a catalyst.

2. The composition of claim 1 where there is an average of at least three silicon-bonded hydrogen groups per organosiloxane resin molecule.

3. The composition of claim 1 wherein greater than 60 mole percent of the $R^1$ and $R^2$ groups are independently selected alkyl groups comprising 1 to 4 carbon atoms.

4. The composition of claim 1 where greater than 75 mole percent of the $R^1$ and $R^2$ groups are independently selected from alkyl groups comprising 1 to 4 carbon atoms.

5. The composition of claim 2 where greater than 75 mole percent of the $R^1$ and $R^2$ groups are methyl.

6. The composition of claim 1 where the sum of a+b+c is in the range 1.5<(a+b+c)<1.8.

7. The composition of claim 1 where the ratio of silicon-bonded hydrogen groups in component (A) to the carbon-carbon double bonds in component (B) is from 1:0.5 to 1:1.5.

8. The composition of claim 1 where the ratio of silicon-bonded hydrogen groups in component (A) to the carbon-carbon double bonds in component (B) is from 1:0.8 to 1:1.2.

9. The composition of claim 1 where the polyene is a polycyclic polyene.

10. The composition of claim 1 where the non-aromatic carbon-carbon double bonds of the polyene have chemically distinguishable reactivities.

11. The composition of claim 1 where the polyene is dicyclopentadiene, an asymmetrical isomer of tricyclopentadiene, or methyl dicyclopentadiene.

12. The composition of claim 1 further comprising (E) at least one reinforcing compound.

13. The composition of claim 1 further comprising (F) at least one filler.

14. The composition of claim 1 where the hydroxyl and alkoxy content of the organosiloxane resin are both less than 6 weight percent.

15. A method comprising the step of
   (i) mixing materials comprising
      (A) 100 parts per weight of at least one organosiloxane resin comprising siloxane units having an empirical formula (I) $H_aR^1_bR^2_cSiO_{(4-a-b-c)/2}$ where each $R^1$ and $R^2$ is an independently selected alkyl group comprising 1 to 4 carbon atoms or an aryl group comprising 6 to 8 carbon atoms, subscript a>0, and subscripts b and c are each 0 or a positive number, and optionally containing alkoxy and/or hydroxy groups, with the proviso that 1.3<(a+b+c)<2.0 and there is an average of at least two silicon-bonded hydrogen groups per molecule;

(B) 20 to 75 parts by weight of at least one polyene having an average of at least two non-aromatic carbon-carbon double bonds per molecule; and (C) a catalyst.

16. A method comprising the step of
(i) mixing materials comprising
  (A) 100 parts per weight of at least one organosiloxane resin comprising siloxane units having an empirical formula (I) $H_a R^1_b R^2_c SiO_{(4-a-b-c)/2}$ where each $R^1$ and $R^2$ is an independently selected alkyl group comprising 1 to 4 carbon atoms or an aryl group comprising 6 to 8 carbon atoms, subscript a>0, and subscripts b and c are each 0 or a positive number, and optionally containing alkoxy and/or hydroxy groups, with the proviso that 1.3<(a+b+c)<2.0 and there is an average of at least two silicon-bonded hydrogen groups per molecule;
  (B) 20 to 75 parts by weight of at least one polyene having an average of at least two non-aromatic carbon-carbon double bonds per molecule with chemically distinguishable reactivities; and
  (C) a catalyst.

17. The method of claim 16 further comprising a step (ii) of adding an inhibitor (D) to the prepolymer composition formed by step (i).

18. A method comprising the steps of
(i) mixing materials comprising
  (A) 100 parts per weight of at least one organosiloxane resin comprising siloxane units having an empirical formula (I) $H_a R^1_b R^2_c SiO_{(4-a-b-c)/2}$ where each $R^1$ and $R_2$ is an independently selected alkyl group comprising 1 to 4 carbon atoms or an aryl group comprising 6 to 8 carbon atoms, subscript a>0, and subscripts b and c are each 0 or a positive number, and optionally containing alkoxy and/or hydroxy groups, with the proviso that 1.3<(a+b+c)<2.0 and there is an average of it least two silicon-bonded hydrogen groups per molecule;
  (B) 20 to 75 parts by weight of at least one polyene having an average of at least two non-aromatic carbon-carbon double bonds per molecule with chemically distinguishable reactivities; and
  (C) a catalyst go to form a prepolymer composition, and then
(iii) heating the prepolymer composition.

19. The method of claim 18 further comprising a step (ii) of adding an inhibitor (D) to the prepolymer composition formed by step (i).

20. A composition comprising
(A) at least one organosiloxane resin comprising siloxane units having an empirical formula (I) $H_a R^1_b R^2_c SiO_{(4-a-b-c)_2}$ where each $R^1$ and $R^2$ is an independently selected alkyl group comprising 1 to 4 carbon atoms or an aryl group comprising 6 to 8 carbon atoms, subscript a>0, and subscripts b and c are each 0 or a positive number, and optionally containing alkoxy and/or hydroxy groups, with the proviso that 1.3<(a+b+c)<2.0 and there is an average of at least two silicon-bonded hydrogen groups per molecule;

(B) at least one polyene having an average of at least two non-aromatic, carbon-carbon double bonds per molecule and chosen from dicyclopentadiene, an asymmetrical isomer of tricyclopentadiene, or; methyl dicyclopentadiene; and (C) a catalyst.

* * * * *